Dec. 20, 1966  D. B. HERRICK  3,292,847
LUBRICANT SEALING MEANS FOR ROTARY POSITIVE DISPLACEMENT PUMP
Filed Nov. 3, 1964
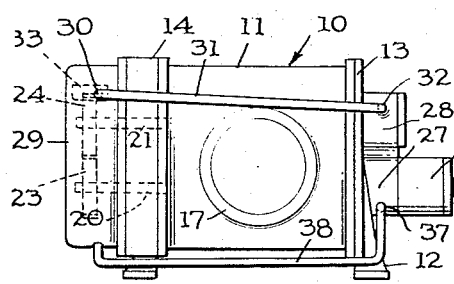
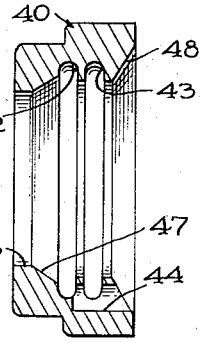
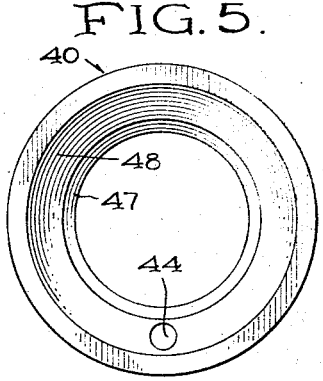
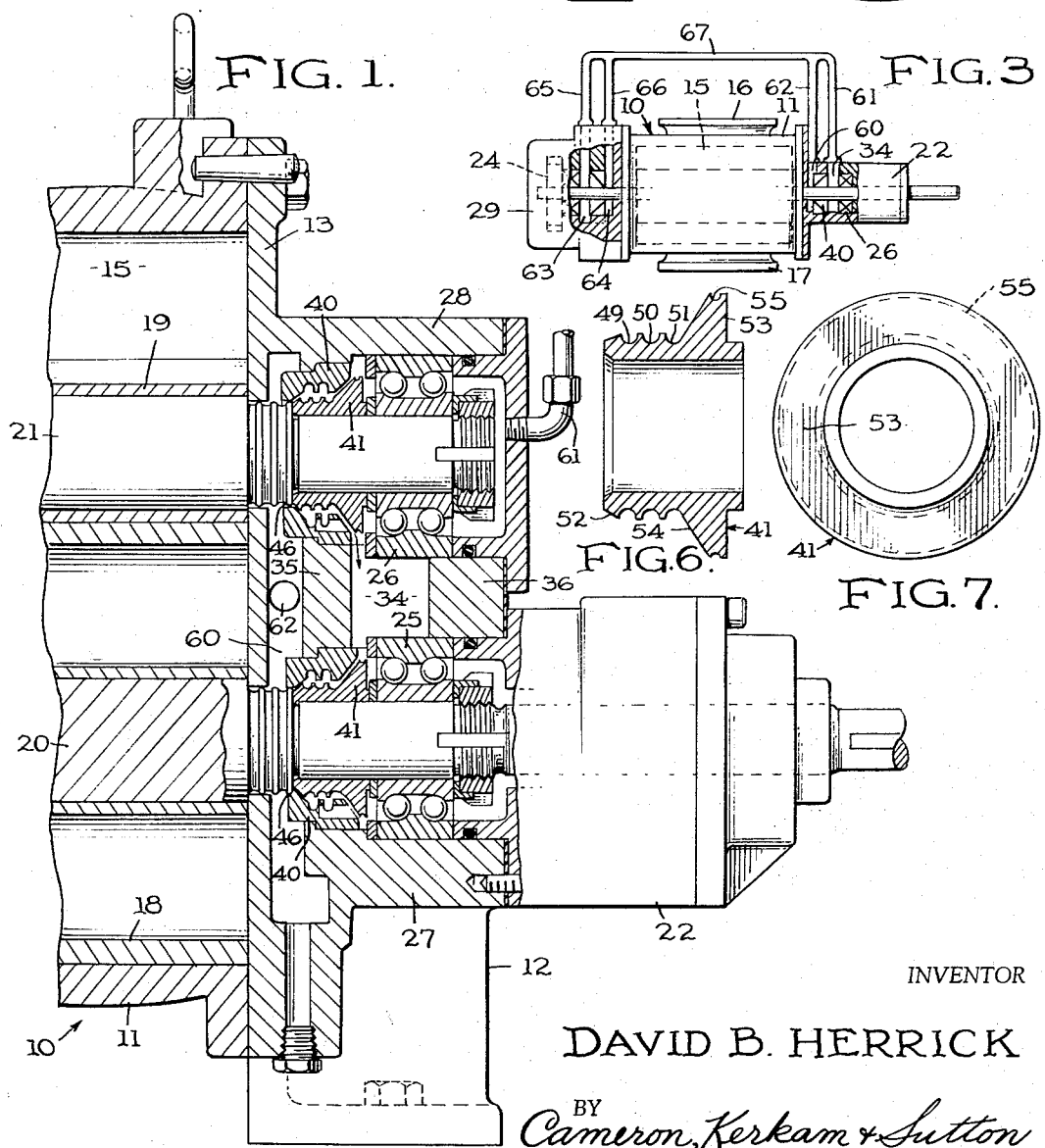
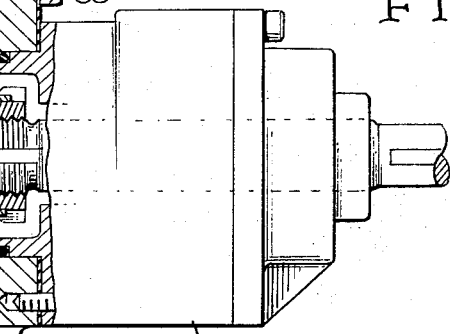
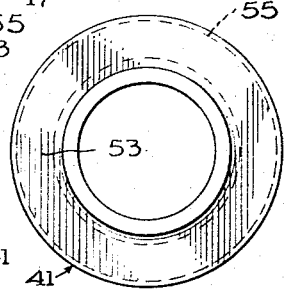
INVENTOR
DAVID B. HERRICK
BY *Cameron, Kerkam & Sutton*
ATTORNEYS

United States Patent Office 3,292,847
Patented Dec. 20, 1966

3,292,847
LUBRICANT SEALING MEANS FOR ROTARY
POSITIVE DISPLACEMENT PUMP
David B. Herrick, Connersville, Ind., assignor to Dresser Industries, Inc., Dallas, Tex., a corporation of Delaware
Filed Nov. 3, 1964, Ser. No. 408,583
10 Claims. (Cl. 230—141)

This invention relates generally to lubricating systems for fluid pumps of the rotary positive displacement type, and more particularly to an improved sealing arrangement for preventing the leakage of lubricant into the pumping chambers of such pumps.

Inasmuch as the invention is especially well adapted for embodiment in high vacuum booster pumps of the rotary impeller type, the following disclosure will be directed primarily to this specific application of the inventive concept. By so doing, however, it is not intended to limit the scope of the invention or its application.

When a rotary positive displacement pump is used as a high vacuum booster pump, it must operate at a very high pressure change. Because the bearings are exposed to vacuum, they cannot be grease lubricated as the high pressure change will cause gas trapped in the grease to expand and blow most of the grease out of the bearings. To avoid this blowout effect economically, such vacuum pump installations often use a splash lubrication system wherein a reservoir of oil is maintained in the gear box, with the timing gears of the pump extending below the surface of the oil in the reservoir so that, during operation of the pump, these gears cause the oil to be flung and splashed about within the gear box. A trough, conveniently located within the gear box, catches some of the oil thrown about by the gears which then flows by gravity from the trough to the bearing chambers of the pump for lubrication of the bearings, and ultimately returns to the gear box through suitable drainage conduits.

While such a design provides the necessary lubrication, it is subject to several disadvantages. For example, to confine the lubricating oil within the bearing area, a contact type seal is generally utilized. Such seals, however, are subject to rapid wear and require frequent replacement. In addition, in high speed applications, as in the case of mechanical vacuum booster pumps, positive contact seals are unsatisfactory because of high friction losses and because wear of the contact surfaces causes considerable oil leakage even in new installations.

Another disadvantage of such prior arrangements is that they are subject to considerable oil leakage at shutdown due to the drainage of oil into the bearing chambers from pipes and passages leading from the gear box after the pump has stopped. The problem is further accentuated in pumps wherein the bearings are arranged one over the other because the lower bearing chamber receives drainage from both the upper bearing and the gear box.

Accordingly, it is the principal object of the present invention to provide a lubricating system for a rotary positive displacement pump embodying improved oil sealing means which function effectively at high speeds of rotation under conditions of relatively high vacuum and practically eliminate oil leakage into the pump.

Another object is to provide a novel sealing arrangement for a high vacuum booster pump which not only reduces seal maintenance to a minimum and thereby effects a considerable saving in operational costs, but also effectively prevents oil leakage at shutdown.

These and other objects of the present invention will appear from the following detailed description of one embodiment thereof. While the specification concludes with claims particularly pointing out and distinctly claiming the subject matter of the invention, it will be described with reference to the accompanying drawing wherein one specific form of lubricating system and sealing means are illustrated. However, it is to be expressly understood that this drawing is illustrative only and is not intended to represent the full scope of the invention as it is defined in the appended claims.

In the drawing, wherein like reference characters indicate like parts throughout the several views:

FIG. 1 is a fragmentary side elevational view, partly in section, of a vacuum pump of the rotary impeller type embodying the present invention;

FIG. 2 is a diagrammatic side view of the pump of FIG. 1 showing the oil feed and return lines of the lubrication system;

FIG. 3 is a diagrammatic plan view, partly in section, of the pump of FIG. 1 showing the vent piping arrangement for preventing oil blow-through;

FIG. 4 is an enlarged axial cross-sectional view of the stationary sleeve member of one of the slinger seals which constitute an important feature of the invention;

FIG. 5 is an end view of the stationary sleeve member of FIG. 4, looking from the right in said figure; and FIGS. 6 and 7 are axial cross-sectional and end views, respectively, on the same enlarged scale as FIGS. 4 and 5, of the rotatable slinger member of the slinger seal.

Referring now to FIGS. 1, 2 and 3 of the drawing, a high vacuum pump embodying the present invention, indicated generally at 10, includes a housing 11 having a supporting base 12. The housing 11 is closed at its opposite ends by head plates 13 and 14 to define therebetween a pump rotor chamber 15 having an inlet 16 and an outlet 17. A pair of multi-lobed rotors 18 and 19 are mounted in chamber 15 on parallel shafts 20 and 21, respectively, shaft 20 being connected at one end to a suitable source of power through a drive assembly 22. The other end of driving shaft 20 is provided with a gear 23 which meshes with and drives a matching gear 24 mounted thereabove on shaft 21, whereby the rotors are driven in opposite directions in timed relationship. The rotor chamber 15 has walls which conform to the path described by the tips of the rotor lobes as they are rotated, and are so dimensioned that a small, substantially gas-tight operating clearance of a few thousandths of an inch or less is provided between said walls and the rotors. Since pumps of this type are well known in the art, only a fragmentary portion of the pump structure is illustrated in FIG. 1.

As shown in FIG. 1, the right-hand ends of shafts 20 and 21 are supported by end thrust bearings 25 and 26 which are mounted in housings 27 and 28, respectively, for lubrication in a manner hereinafter described. It will be understood that the opposite ends of shafts 20 and 21 are supported by radial bearings mounted in head plate 14, and that the timing gears 23 and 24 are suitably mounted in a gear box 29 containing a reservoir of oil which is continuously cycled through the pump for lubrication of the bearings and gears.

The lower gear 23 extends below the surface of the oil in the reservoir so that, as the rotors are turned, oil will be drawn up by gear 23 and splashed about within the gear box 29. A trough 33 conveniently located near the upper end of gear box 29 traps some of the splashed oil, and the oil so trapped is then delivered by gravity through a suitable conduit arrangement to the bearing assemblies.

As shown in FIG. 2, the trough 33 is provided with an outlet 30, extending through the wall of gear box 29, to which is connected a conduit 31 leading to an oil inlet 32 in the housing 28 of bearing 26. Outlet 30 is located somewhat higher than inlet 32 so that oil will flow from the trough through conduit 31 to bearing housing 28 by gravity. From inlet 32 the oil flows into bearing housing 28, through bearing 26 and then downwardly through passage 34, formed between wall members 35 and 36 of head plate 13, to the lower bearing 25 in housing 27. An outlet 37 is provided in the wall of bearing housing 27 to which is connected a conduit 38 which carries the oil back to the reservoir in gear box 29.

Thus far, there has been described a known type of vacuum pump of the rotary positive displacement type whose operation is well known in the art. Although only a fragmentary section of the pump assembly has been shown in order to illustrate the sealing arrangement of the present invention, it will be understood that the portion of the pump broken away and not illustrated in detail is also provided with bearings and oil sealing means similar to those shown in FIG. 1.

In accordance with the invention, each of shafts 20 and 21 is provided with a non-contact slinger seal at each end thereof, each seal comprising a stationary sleeve member 40 and a cooperating rotatable slinger member 41 positioned between the associated bearing 25 or 26 and the rotor chamber 15, and adapted to prevent oil from leaking from the bearing into the rotor chamber. Each sleeve 40 is fixed with respect to its corresponding housing 27 or 28, while each slinger member 41 is secured to and rotates with its corresponding shaft 20 or 21. Since these seals are identical in construction and mode of operation, the following description will be limited to one of the seal assemblies, it being understood the same description is equally applicable to the other assemblies.

Referring now to FIGS. 1 and 4–7, the sleeve 40 of each seal is preferably constructed of steel, and is provided with a plurality of annular channels 42 and 43 in the internal surface thereof, and an axially or horizontally extending drainage passage 44 in the lower portion thereof which extends from the outboard end of the sleeve adjacent the associated bearing to the innermost annular channel 42. Drainage passage 44 maintains the annular channels 42 and 43 in communication with the oil drainage passages.

The internal surface of the inboard end of sleeve 40 forms an axial shoulder portion 45 which is positioned in close relationship to a rib 46 on the associated rotor shaft 20 or 21. Between the shoulder portion 45 and annular channel 42, sleeve 40 has an outwardly inclined surface 47, while a second inclined surface 48 extends outwardly from channel 43 to the outboard end of the sleeve 40.

The rotatable slinger member 41 of each seal, which may be constructed either of steel or, if desired, of a softer, more wearable material, is fixed to the associated rotor shaft within the sleeve member 40, and has an external surface shaped for cooperation with the internal surface of the sleeve member. To this end, the slinger member 41 is provided a plurality of external annular channels 49, 50 and 51, one more than those provided on sleeve 40. In the assembled position, channels 49, 50 and 51 are displaced slightly in an axial direction from channels 42 and 43, so that the radially extending portions of slinger member 41 are positioned approximately in the centers of the channels 42 and 43 of the sleeve member 40. The slinger member 41 is also provided at its inboard end with an inclined surface 52 positioned closely adjacent and parallel to the inclined surface 47 of sleeve member 40, and at its outboard end with a radially projecting rib 53 having an inclined surface 54 parallel and closely adjacent to the inclined surface 48 of sleeve member 40, and an annular channel 55 in the tip thereof. Preferably, the fixed sleeve 40 and rotatable slinger 41 are so formed that a small operating clearance of approximately .006″ to .016″ is maintained between the inclined surfaces 47 and 52, and 48 and 54, respectively.

In operation, a suitably quantity of oil is maintained in the reservoir in gear box 29. Upon rotation of the drive shaft, gears 23 and 24 cause the oil to be splashed about, some of which is trapped in the trough 33 located in the gear box. The bearing assemblies adjacent the gears 23 and 24 are in direct communication with the gear box and are lubricated by the oil mist or spray which is produced by the rotating gears. The oil caught in trough 33 flows by gravity through conduit 31 and inlet 32 to the upper bearing assembly 26 at the drive end of the pump, and thence through passage 34 to the lower bearing assembly 25, from which it returns to the reservoir by gravity through conduit 38.

Interposed between each bearing and the pumping chamber is the slinger seal of the present invention which, by its centrifugal slinging action, effectively prevents oil from flowing axially with respect to the rotor shaft into the chamber 15 while the pump is operating. Upon shutdown of the pump, the trough 33 in gear box 29 and conduit 31 contains a certain amount of oil which gradually drains into the bearing housing 28 and collects in the pockets formed by the annular channels 42 and 43 in the fixed sleeve 40 of the upper slinger seal. Some of this oil, together with that draining from bearing 25, also collects in the lower bearing housing 27 and finds its way into the pockets of the lower slinger seal. However, upon restarting of the pump, this trapped oil does not escape into the pumping chamber 15, but is pumped out of the stationary sleeves 40 by the action of the slinger members 41 as their inclined surfaces 48 pass the drainage holes 44.

When a rotary positive displacement pump is used in a vacuum pumping installation, the bearing assemblies are normally exposed to vacuum and a pressure difference builds up across the seals which tends to cause a blow-through of the oil into the pumping chamber. In the lubricating system of the present invention, the venting arrangement illustrated in FIGS. 1 and 3 effectively prevents the build-up of such a pressure difference across the seals.

As shown, the chamber 34 between the oil seal assemblies and the drive end bearings 25 and 26 is placed in communication with the chamber 60, which lies between the seals and the end wall of pumping chamber 15, by means of conduits 61 and 62. Similarly, at the opposite or gear end of the pump the chamber 63, between the seals and the bearings, and the chamber 64, between the seals and the pumping chamber, communicate with each other through conduits 65 and 66. The conduits 61, 62, 65 and 66 are commonly connected by another conduit 67 to equalize the pressures existing across the seals.

There is thus provided by the present invention an improved lubrication system for a rotary positive displacement pump including novel slinger type seals which effectively prevent oil leakage into the pumping chamber both while the pump is operating and after shut-down. Although only one particular embodiment of the invention has been described and illustrated, it will be obvious to those skilled in the art that the inventive concept is capable of a variety of mechanical modifications. It is therefore intended by the appended claims to cover all such modifications which fall within the true scope of the invention.

What is claimed is:

1. In a rotary positive displacement vacuum pump having a casing forming a pumping chamber, a fluid inlet and a fluid outlet in communication with said chamber, a pair of multilobed interfitting impellers mounted within said chamber on spaced parallel shafts geared together for rotation in opposite directions so as to displace fluid from said inlet to said outlet, bearing means supporting each of said shafts at the opposite ends thereof, and means for supplying lubricating oil to said bearing means, the improvement comprising sealing means for preventing oil from passing from said bearing means into said chamber, said sealing means being disposed between said bearing means and said chamber and including a rotatable member carried by each of said shafts, said member having a slinger element at the end thereof adjacent said bearing means, a fixed sleeve member disposed about and spaced from each of said rotatable members and having at least one annular groove in the inner surface thereof, said groove forming a pocket for trapping oil when the pump is shut down, a drainage passage in said fixed sleeve member leading from said groove to a position adjacent said slinger element, whereby trapped oil is pumped out of said pocket through said drainage passage upon rotation of said slinger element and means for preventing a differential pressure build up across said sealing means including a plurality of passages, each passage having one end disposed in common communication and the other disposed in communication with one side of said sealing means such that the pressure across said sealing means is equalized.

2. In a rotary positive displacement vacuum pump having a casing forming a pumping chamber, a fluid inlet and a fluid outlet in communication with said chamber, a pair of multi-lobed interfitting impellers mounted within said chamber on spaced parallel shafts geared together for rotation in opposite directions so as to displace fluid from said inlet to said outlet, bearings supporting each of said shafts at the opposite ends thereof, and means for supplying lubricating oil to said bearings, the improvement comprising sealing means for preventing oil from passing from said bearings into said chamber, said sealing means being disposed between said bearings and said chamber and comprising a rotatable member carried by each of said shafts having a plurality of annular grooves in the outer surface thereof and a radially projecting slinger element at the end thereof adjacent the shaft bearing, and a cooperating fixed sleeve member surrounding and spaced from said rotatable member, said fixed sleeve member having a plurality of annular grooves in the inner surface thereof cooperating with the grooves in said rotatable member to form pockets for trapping oil when the pump is shut down, an axially extending drainage passage in said fixed sleeve member connecting said pockets to the end of said sleeve member adjacent said slinger element, whereby trapped oil is pumped out of said pockets through said drainage passage upon rotation of said slinger element and venting means for preventing a differential pressure build up across said sealing means including a plurality of conduits each conduit having one end disposed in common communication and the other end disposed in communication with one side of said sealing means such that the pressure across said sealing means is equalized.

3. In a rotary positive displacement vacuum pump having a casing forming a pumping chamber, a fluid inlet and a fluid outlet in communication with said chamber, a pair of multi-lobed interfitting impellers mounted within said chamber on spaced parallel shafts geared together for rotation in opposite directions so as to displace fluid from said inlet to said outlet, a bearing supporting each end of each of said shafts, and means for supplying lubricating oil to said bearings, the improvement comprising a seal disposed between each of said bearings and said chamber for preventing oil from passing from said bearing into said chamber, each of said seals including a rotatable member carried by the shaft between the bearing and the chamber having a radially projecting slinger element at the end of said member adjacent the bearing, the side of said slinger element remote from the bearing having a surface inclined to the axis of the shaft, a fixed sleeve member surrounding and spaced from said rotatable member and having a plurality of annular grooves in the inner surface thereof forming pockets for trapping oil when the pump is shut down, the end of said fixed sleeve member adjacent the bearing having an inclined surface parallel to and closely adjacent the inclined surface of said slinger element, a drainage passage leading from said pockets to the inclined surface of said sleeve member through which trapped oil may be pumped out of said pockets due to movement of the inclined surface of said slinger element past the end of said passage when the slinger element is rotated and venting means for preventing a differential pressure build up across said sealing means including a plurality of conduits, each conduit having one end disposed in common communication and the other end disposed in communication with one side of said sealing means such that the pressure across said sealing means is equalized.

4. Oil sealing means as set forth in claim 3 wherein the inclined surfaces of said slinger element and said fixed sleeve member are so spaced as to provide an operating clearance therebetween of approximately .006" to .016".

5. Oil sealing means as set forth in claim 3 wherein the ends of said rotatable member and said fixed sleeve member adjacent said pumping chamber are provided with parallel, closely spaced surfaces inclined to the axis of the shaft.

6. In a rotary positive displacement vacuum pump comprising a casing forming a pumping chamber, a fluid inlet and a fluid outlet in communication with said chamber, a pair of multi-lobed interfitting impellers mounted within said chamber on spaced parallel shafts, the ends of said shafts extending outwardly beyond the ends of said chamber, means forming bearing chambers into which the ends of said shafts extend, bearings in said bearing chambers supporting each of said shafts at the opposite ends thereof, means for supplying lubricating oil to said bearings, and sealing means disposed in said bearing chambers between each of said bearings and said pumping chamber for preventing oil from passing from said bearings into said pumping chamber, each of said sealing means including a rotatable member carried by one of said shafts and a cooperating fixed sleeve member disposed about and spaced from said rotatable member, said rotatable member having a radially projecting slinger element adapted to throw oil into a first space within the bearing chamber on the side of said sealing means remote from said pumping chamber, there being a second space within the bearing chamber on the side of said sealing means adjacent said pumping chamber, said fixed sleeve member having a plurality of annular grooves in the inner surface thereof between said slinger element and said pumping chamber forming pockets for trapping oil when the pump is shut down, a drainage passage in said sleeve member connecting said pockets to an end surface of said sleeve member adjacent said slinger element through which trapped oil is pumped out of said pockets upon rotation of said slinger element, and venting means for preventing the build-up of a pressure difference across said sealing means including conduit means commonly connecting said first and second spaces.

7. A rotary positive displacement pump as set forth in claim 6 including additional conduit means connecting the first and second spaces within one of said bearing chambers with the first and second spaces in the other of said bearing chambers.

8. A seal for preventing the leakage of lubricating oil along a shaft comprising a rotatable member fixed to said shaft having an axially extending portion and an annular, radially projecting slinger element at one end, a stationary sleeve member having an axially extending portion surrounding and spaced from the axially extending portion of said rotatable member and an annular, radially projecting portion disposed adjacent said radially projecting slinger element, said radially projecting slinger element and said radially projecting portion of said sleeve member each having an inclined surface disposed in spaced relationship and cooperating with each other to effect a pumping action upon rotation of said slinger member, each of said axially extending portions having a plurality of annular grooves in the facing surfaces thereof, said grooves forming pockets for catching oil which attempts to leak along the axially extending portion of said rotatable member, and a drainage passage in said stationary sleeve member leading from said pockets to a point closely adjacent said slinger element through which oil may be pumped out of said pockets upon rotation of said rotatable member.

9. A seal for preventing the leakage of lubricating oil along the shaft comprising a rotatable member fixed to said shaft having an axially extending portion and an annular radially projecting slinger element, said axially extending portion having a plurality of annular grooves in the outer surface thereof and said slinger element having a surface inclined to the axis of the shaft, a stationary sleeve member surrounding and spaced from said axially extending portion and having a plurality of annular grooves in the inner surface thereof facing towards the grooves in said rotatable member, said grooves cooperating to form pockets for catching oil which attempts to leak along the axially extending portion of said rotatable member, said sleeve member also having an inclined surface parallel to and closely adjacent the inclined surface of said slinger element and cooperating therewith to effect a pumping action upon rotation of said slinger element, and an axially extending drainage passage in said sleeve member leading from said pockets to the inclined surface of said sleeve member through which oil may be pumped out of said pockets upon rotation of said rotatable member.

10. A seal as set forth in claim 9 wherein the inclined surfaces of said slinger element and said sleeve member are so spaced as to provide an operating clearance therebetween of approximately .006" to .016".

References Cited by the Examiner
UNITED STATES PATENTS

| | | | |
|---|---|---|---|
| 776,669 | 12/1904 | Mattice | 277—67 |
| 1,368,998 | 2/1921 | Barr | 208—36.4 |
| 1,463,018 | 7/1923 | Junggren | 308—36.4 |
| 1,621,751 | 3/1927 | Pruger | 308—36.4 |
| 1,724,902 | 8/1929 | Bentley | 308—187 |
| 2,133,230 | 10/1938 | Sanders | 277—67 |
| 2,841,244 | 7/1958 | Sorem | 308—187 |
| 2,848,952 | 8/1958 | Wakeman | 103—126 |
| 3,105,724 | 10/1963 | Van Dijk et al. | 308—36.4 |
| 3,162,451 | 12/1964 | Brose | 277—53 |

MARK NEWMAN, *Primary Examiner.*

WILBUR J. GOODLIN, *Examiner.*